US010824806B2

(12) United States Patent
Bhowmick et al.

(10) Patent No.: US 10,824,806 B2
(45) Date of Patent: *Nov. 3, 2020

(54) COUNTERINTUITIVE RECOMMENDATIONS BASED UPON TEMPORARY CONDITIONS

(71) Applicant: International Business Machines Corporation, Armonk, NY (US)

(72) Inventors: Arindam Bhowmick, Dublin, CA (US); Carlos Chivardi, Glen Ellyn, IL (US); Jennifer M. Hatfield, San Francisco, CA (US); Gregory S. Hurlebaus, Rochester, MN (US); Josef Scherpa, Fort Collins, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/373,145

(22) Filed: Apr. 2, 2019

(65) Prior Publication Data

US 2019/0228066 A1      Jul. 25, 2019

Related U.S. Application Data

(63) Continuation of application No. 15/646,304, filed on Jul. 11, 2017, now Pat. No. 10,275,451.

(51) Int. Cl.
*G06F 40/284* (2020.01)
*G06Q 30/02* (2012.01)
(Continued)

(52) U.S. Cl.
CPC ...... *G06F 40/284* (2020.01); *G06F 16/90332* (2019.01); *G06F 16/9535* (2019.01);
(Continued)

(58) Field of Classification Search
CPC ............................ G06F 17/277; G06F 40/284
(Continued)

(56) References Cited

U.S. PATENT DOCUMENTS

| 6,370,513 B1 | 4/2002 | Kolawa et al. |
| 7,092,936 B1 | 8/2006 | Alonso et al. |

(Continued)

FOREIGN PATENT DOCUMENTS

WO    2014028765 A2    2/2014

OTHER PUBLICATIONS

Adomavicius et al., "Context-Aware Recommender Systems," (article) AI Magazine, 2011, Fall Issue, vol. 32, No. 3, pp. 67-80, Association for the Advancement of Artificial Intelligence (www.aaai.org).

(Continued)

*Primary Examiner* — Susan I McFadden
(74) *Attorney, Agent, or Firm* — Nathan M. Rau

(57) ABSTRACT

A system and method for providing counter intuitive recommendations to a user. A user profile is obtained for the user. A determination is made that a trigger condition has occurred for the user. The duration of the trigger condition is also determined. The trigger condition is associated with the user's profile. A request for a recommendation is received, and a list of recommendations is obtained. The recommendations are compared against the trigger condition to determine if the recommendation is compatible with the trigger condition. Those recommendations determined not to be compatible with the trigger condition are removed from the set of recommendations.

20 Claims, 10 Drawing Sheets

(51) Int. Cl.
*G06F 16/9535* (2019.01)
*G06F 16/9032* (2019.01)
*G06F 40/30* (2020.01)
*G06F 40/295* (2020.01)

(52) U.S. Cl.
CPC ............ *G06F 40/295* (2020.01); *G06F 40/30* (2020.01); *G06Q 30/0269* (2013.01)

(58) Field of Classification Search
USPC .......................................................... 704/9
See application file for complete search history.

(56) References Cited

U.S. PATENT DOCUMENTS

| | | | |
|---|---|---|---|
| 8,103,540 B2 | 1/2012 | Gross | |
| 8,463,295 B1 | 6/2013 | Caralis et al. | |
| 8,606,801 B2 | 12/2013 | Goldstein et al. | |
| 8,620,764 B2 | 12/2013 | Moritz et al. | |
| 8,756,100 B1 | 6/2014 | Yanacek et al. | |
| 8,949,871 B2 * | 2/2015 | Chai ...................... | H04H 60/45 725/10 |
| 9,307,378 B2 | 4/2016 | Johansson | |
| 9,355,361 B2 | 5/2016 | Pinckney et al. | |
| 9,384,661 B1 | 7/2016 | DeLuca et al. | |
| 9,390,706 B2 | 7/2016 | Gustafson et al. | |
| 9,448,693 B2 | 9/2016 | Bhowmick et al. | |
| 9,501,764 B2 | 11/2016 | Wu et al. | |
| 9,509,642 B2 | 11/2016 | Wu et al. | |
| 9,563,404 B2 | 2/2017 | Schwartz et al. | |
| 9,584,583 B2 | 2/2017 | Schwartz | |
| 9,600,571 B2 | 3/2017 | Shaashua et al. | |
| 9,760,609 B2 | 9/2017 | Kelley | |
| 9,818,088 B2 | 11/2017 | Penilla et al. | |
| 10,147,130 B2 * | 12/2018 | Scholl .................... | G06Q 30/02 |
| 10,275,451 B2 * | 4/2019 | Bhowmick ........... | G06F 17/277 |
| 2002/0022981 A1 | 2/2002 | Goldstein | |
| 2002/0147619 A1 | 10/2002 | Floss et al. | |
| 2007/0022040 A1 | 1/2007 | Gordon | |
| 2007/0073593 A1 | 3/2007 | Perry et al. | |
| 2007/0210938 A1 | 9/2007 | Deurwaarder et al. | |
| 2010/0094878 A1 | 4/2010 | Soroca et al. | |
| 2010/0169131 A1 | 7/2010 | Robertson | |
| 2011/0125580 A1 | 5/2011 | Erhart et al. | |
| 2011/0145040 A1 | 6/2011 | Zahn et al. | |
| 2011/0213787 A1 | 9/2011 | Cerny | |
| 2012/0330698 A2 | 12/2012 | Gilliam | |
| 2013/0144802 A1 | 6/2013 | Bank et al. | |
| 2013/0238710 A1 | 9/2013 | Meshulam et al. | |
| 2013/0268302 A1 | 10/2013 | Jayaram | |
| 2013/0339341 A1 | 12/2013 | Fan et al. | |
| 2013/0346124 A1 | 12/2013 | Stern et al. | |
| 2014/0058884 A1 | 2/2014 | Goldstein | |
| 2014/0095599 A1 | 4/2014 | Engle | |
| 2014/0229498 A1 | 8/2014 | Dillon et al. | |
| 2014/0278071 A1 | 9/2014 | Filippo et al. | |
| 2014/0278601 A1 | 9/2014 | Brunn | |
| 2014/0297672 A1 | 10/2014 | Song et al. | |
| 2014/0365313 A1 | 12/2014 | Reese | |
| 2015/0019342 A1 | 1/2015 | Gupta | |
| 2015/0019710 A1 | 1/2015 | Shaashua et al. | |
| 2015/0038172 A1 | 2/2015 | Sengupta et al. | |
| 2015/0066915 A1 | 3/2015 | Golder et al. | |
| 2015/0161649 A1 | 6/2015 | Eggleston et al. | |
| 2015/0163256 A1 | 6/2015 | Frank | |
| 2015/0220951 A1 | 8/2015 | Kurapati et al. | |
| 2015/0276419 A1 | 10/2015 | Hashem et al. | |
| 2015/0278225 A1 | 10/2015 | Weiss et al. | |
| 2015/0356201 A1 | 12/2015 | Kothe et al. | |
| 2015/0356417 A1 | 12/2015 | Faith et al. | |
| 2015/0356441 A1 | 12/2015 | Faith et al. | |
| 2016/0012512 A1 | 1/2016 | Haiby | |
| 2016/0069705 A1 | 3/2016 | Brenner et al. | |
| 2016/0165402 A1 | 6/2016 | Turner et al. | |
| 2016/0171110 A1 | 6/2016 | Gao et al. | |
| 2016/0178376 A1 | 6/2016 | Moore | |
| 2016/0180723 A1 | 6/2016 | Tatourian et al. | |
| 2016/0234152 A1 | 8/2016 | Allen et al. | |
| 2017/0053217 A1 | 2/2017 | Pardesi | |
| 2017/0091713 A1 | 3/2017 | Paris | |
| 2017/0093967 A1 | 3/2017 | Grosz | |
| 2017/0094487 A1 | 3/2017 | Phan et al. | |
| 2017/0132536 A1 | 5/2017 | Goldstein | |
| 2017/0178259 A1 | 6/2017 | Goldstein | |
| 2017/0180488 A1 | 6/2017 | Goldstein | |

OTHER PUBLICATIONS

Adomavicius et al., "Context-Aware Recommender Systems," (preliminary book chapter) Recommender Systems Handbook: A Complete Guide for Research Scientists and Practitioners, 2010, pp. 1-37. ids.csom.umn.edu/faculty/gedas/nsfcareer/CARS-chapter-2010.pdf.

Lopez-Nores et al. "Context-Aware Recommender Systems Influenced by the Users' Health-Related Data," User Modeling and Adaptation for Daily Routines: Providing Assistance to People with Special Needs, Human-Computer Interaction Series, Chapter 6, pp. 153-173, Jan. 22, 2013, Springer-Verlag London 2013.

Amer-Yahia et al., "Group Recommendation: Semantics and Efficiency," VLDB '09: Proceedings of the VLDB Endowment, Aug. 2009, 12 pages.

Carvalho et al., "Users' Satisfaction in Recommendation Systems for Groups: an Approach Based on Noncooperative Games," WWW '13 Companion, Proceedings of the 22nd International Conference on World Wide Web, May 2013, pp. 951-958.

Masthoff, J., "Chapter 21—Group Recommender Systems: Combining Individual Models," Recommender Systems Handbook, Oct. 5, 2010, pp. 677-702, Springer Science+Business Media, LLC 2011.

O'Connor et al., "PolyLens: A Recommender System for Groups of Users," ECSCW '01: Proceedings of the seventh conference on European Conference on Computer Supported Cooperative Work, Sep. 2001, 20 pages.

"Hopper App," https://www.hopper.com/corp/about.html, printed: Jul. 10, 2017, 3 pages.

Mell et al., "The NIST Definition of Cloud Computing," Recommendations of the National Institute of Standards and Technology, Special Publication 800-145, Sep. 2011, 7 pages, National Institute of Standards and Technology, Gaithersburg, MD.

Bhowmick et al., "Group Recommendations Based on External Factors," U.S. Appl. No. 15/646,246, filed Jul. 11, 2017.

Bhowmick et al., "Group Formation and Recommendations Based on Trigger Events," U.S. Appl. No. 15/646,261, filed Jul. 11, 2017.

Bhowmick et al., "Real Time Recommendation Engine," U.S. Appl. No. 15/646,280, filed Jul. 11, 2017.

Bhowmick et al., "Counterintuitive Recommendations Based Upon Temporary Conditions," U.S. Appl. No. 15/646,304, filed Jul. 11, 2017.

List of IBM Patents or Patent Applications Treated as Related, Signed Apr. 2, 2019, 2 pages.

* cited by examiner

COUNTERINTUITIVE RECOMMENDATIONS BASED UPON TEMPORARY CONDITIONS

BACKGROUND

The present disclosure relates generally to the field of natural language processing, and, more particularly, to using natural language processing in making recommendations to individuals and users.

As a field of computer science, natural language processing tends to focus on the relationships between computer systems and human languages. Many modern natural language processing algorithms are derived based on machine learning and rely greatly on statistical inferences. By analyzing large sets of real-world examples of natural language usages, a computer system may be able to glean sets of rules that guide the machine through a future analysis of natural language passages.

Recommendations and recommender systems make recommendations to users based on a comparison of the user's profile with profiles of other users who make use of a marketplace. However, these recommendations have historically been based off of the relationships between items. Typically, this has been in the form of "people who have bought this have also bought these items". More advanced systems of recommendations look at the items themselves to determine if the items are related, and the user may be interested in the items based on a similarity between the item being looked at and these items. However, these recommendation systems are limited in that they are based on the needs of the merchant offering the recommendations and not based on other needs, wants or desires of the consumer. The goal of the recommendation systems is to have the user buy a particular item from the merchant.

SUMMARY

Embodiments of the present disclosure include a method for providing counter intuitive recommendations to individuals based on the profiles of the individuals/groups and the features of various activities, events, locations, etc., as well as a computer program product and a system for implementing the method. As part of the method, a user profile is obtained for the user. A determination that a trigger condition has occurred for the user. The duration of the trigger condition is also determined. The trigger condition is associated with the user's profile. A request for a recommendation is received, and a list of recommendations is obtained. The recommendations are compared against the trigger condition to determine if the recommendation is compatible with the trigger condition. Those recommendations determined not to be compatible with the trigger condition are removed from the set of recommendations provided to the user.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
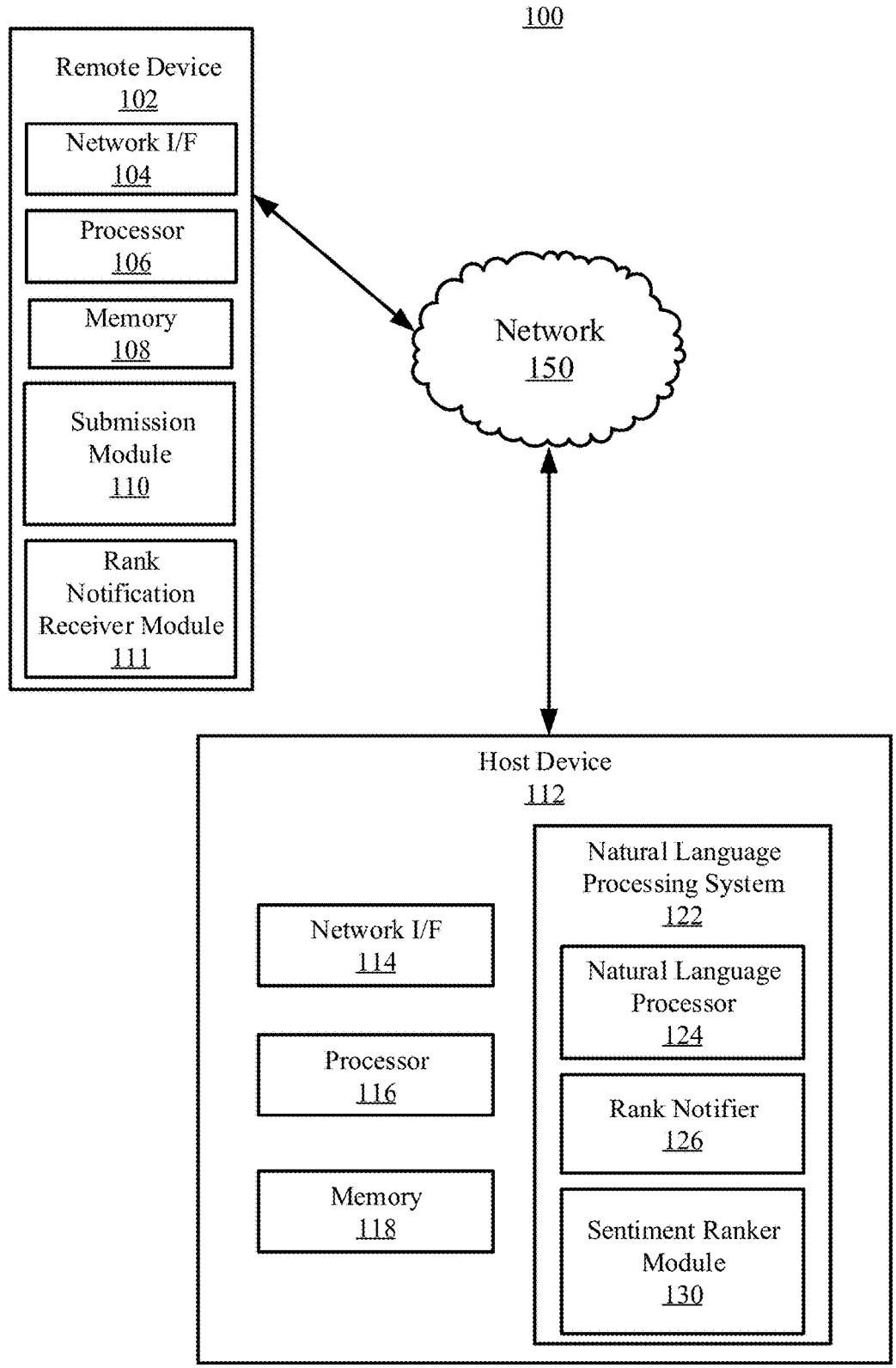
FIG. 1 illustrates a block diagram of an example computing environment in which illustrative embodiments of the present disclosure may be implemented.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Aspects of the present disclosure relate generally to the field of natural language processing, and in particular to providing recommendations to individuals, groups or combinations thereof based on the analysis of external events and conditions. This information is contained in a variety of data sources which present data or information in natural language, which must be analyzed for a computer system and/or computing application to generate meaning and understand. While the present disclosure is not necessarily limited to such applications, various aspects of the disclosure may be appreciated through a discussion of various examples using this context.

Currently, individuals don't have an easy way to get a quick insight into what is available to them that also matches their taste and interests. There are some major events that are quick to identify (e.g. major sports games, museums, concerts, festivals, etc.), but there are an infinite number of places and activities that could be of interest to an individual. Often these activities and places are only familiar to a few (typically local) individuals. Furthermore, some events or activities, are only of interest to certain individuals based on, for example, their hobbies, personality, interests, etc. Only a person familiar with these particular events and/or activities, and who also knows the particular individual very well, for example, at a personal level, would be able to provide those particular insights to the individual. As a result, there are an infinite number of missed opportunities that would have resulted in the individual being able to do the activities that they would enjoy the most at a particular place. Having this information would enhance the quality and enjoyment of their travel or other experience.

Also, currently, individuals have a very short time window to try to maximize the use of their time while they're on vacation and away from work or other commitments. The average person in the US spends only 16 days of their allocated 22 days of vacation and holidays. Overall, in 2016 Americans had over 658 million vacation days that went unused. A small number of individuals plan their itinerary at a destination in great detail in advance of arriving at a destination. At most individuals, typically, identify a few key activities that they would like to do at the location, and leave the rest to sort out once they are there. Many times these activities are the "popular" activities at the location. Many individuals do research online and on their mobile devices once they are at their destination. This approach consumes precious vacation time that the individuals could better use, and results in missed opportunities and lost vacation time. With the vast amount of information currently available online, through various different data sources, it is impossible for an individual to browse through this enormous amount of online information, as well as any online reviews of each potential activity, location, event, etc. Further, this information is in a constant state of flux, constantly changing as new information and/or reviews are posted for both new and existing activities. Additionally, there are numerous new sources of information that come online on a regular basis. Some of these sites are legitimate sites providing relatively unbiased information about activates, locations, events, products, etc. However, it is relatively easy to create online information that provides highly biased viewpoints on the activities, locations, events, products, etc., either to drive traffic to or away from the particular products. Identifying the legitimate sites from the biased sites can also be a challenge. The amount of information makes it impossible to have a thorough analysis of the potential options without sacrificing a considerable amount of vacation time. Conversely, sacrificing this time to look at all the potential options, opinions and reviews, makes it increasingly likely that the selected activity won't be enjoyable, have good quality or be a good fit for the individuals.

It's also increasingly difficult finding an activity that every person within the same group would enjoy doing. This group can be a group traveling or can be any type of group that desires to do things together. This takes additional research and discussion to take everyone's ideal activities in consideration. This results in even more wasted time, and potentially choosing an activity that some people in the group will not enjoy.

As discussed above, aspects of the disclosure may relate to natural language processing to provide recommendations. Accordingly, an understanding of the embodiments of the present disclosure may be aided by describing embodiments of natural language processing systems and the environments in which these systems may operate. Turning now to the figures, FIG. 1 illustrates a block diagram of an example computing environment 100 in which illustrative embodiments of the present disclosure may be implemented. In some embodiments, the computing environment 100 may include a remote device 102 and a host device 112.

Consistent with various embodiments, the remote device 102 and the host device 112 may be computer systems. The remote device 102 and the host device 112 may include one or more processors 106 and 116 and one or more memories 108 and 118, respectively. The remote device 102 and the host device 112 may be configured to communicate with each other through an internal or external network interface 104 and 114. The network interfaces 104 and 114 may be, for example, modems or network interface cards. The remote device 102 and/or the host device 112 may be equipped with a display or monitor. Additionally, the remote device 102 and/or the host device 112 may include optional input devices (e.g., a keyboard, mouse, or other input device), and/or any widely available or custom software (e.g., browser software, communications software, search engine and/or web crawling software, natural language processing software, etc.). In some embodiments, the remote device 102 and/or the host device 112 may be servers, desktops, laptops, or hand-held devices.

The remote device 102 and the host device 112 may be distant from each other and communicate over a network 150. In some embodiments, the host device 112 may be a central hub from which remote device 102 can establish a communication connection, such as in a client-server networking model. Alternatively, the host device 112 and remote device 102 may be configured in any other suitable networking relationship (e.g., in a peer-to-peer configuration).

In some embodiments, the network 150 can be implemented using any number of any suitable communications media. For example, the network 150 may be a wide area network (WAN), a local area network (LAN), or the Internet. In certain embodiments, the remote device 102 and the host device 112 may be local to each other and communicate via any appropriate local communication medium. For example, the remote device 102 and the host device 112 may communicate using a local area network (LAN), one or more hardwire connections, or a wireless link. In some embodiments, the remote device 102 and the host device 112 may be communicatively coupled using a combination of one or more networks and/or one or more local connections. For example, the first remote device 102 may be hardwired to the host device 112 (e.g., connected with an Ethernet cable) while a second remote device (not shown) may communicate with the host device using the network 150 (e.g., over the Internet).

In some embodiments, the network 150 can be implemented within a cloud computing environment, or using one or more cloud computing services. Consistent with various embodiments, a cloud computing environment may include a network-based, distributed data processing system that provides one or more cloud computing services. Further, a cloud computing environment may include many computers (e.g., hundreds or thousands of computers or more) disposed within one or more data centers and configured to share resources over the network 150.

In some embodiments, the remote device 102 may enable users to submit (or may submit automatically with or without user input) electronic documents (e.g., web pages, social media feeds and profiles, etc) containing profile information or information useful for determining the preferences of the user to the host devices 112 in order to have the profile information ingested and analyzed for sentiment (e.g., by natural language processing system 122). For example, the remote device 102 may include submission module 110 and a user interface (UI). The submission module 110 may be in the form of a web browser, application, or any other suitable software module, and the UI may be any type of interface (e.g., command line prompts, menu screens, graphical user interfaces). The UI may allow a user to interact with the remote device 102 to submit, using the submission module 110, one or more web pages or social media feeds containing information related to the interests of the submitter to the host device 112. In some embodiments, the submission module 110 may incorporate a web crawler or other software that allows the module to search for and automatically identify profile information for submission to the host device 112. In some embodiments, the submission module may also receive information related to reviews of activities, locations, events, etc.

In some embodiments, the information being submitted via the submission module 110 may all belong to (or may have all been created on a website that is owned by) the same entity that is submitting them for analysis. This may occur, for example, when an airline submits customer information that was provided directly to the airline by customers who have purchased travel from the airline. In some other embodiments, the entity submitting the information may be different from the entity that originally received (e.g., collected) the individual profiles or reviews from consumers. This may occur, for example, when the entity receives reviews from a third party (e.g., a consumer survey company), for free or for a fee, and then submits these reviews for analysis.

In some embodiments, the remote device 102 may further include a rank notification receiver module 111. This module may be configured to receive notifications, from the host device 112, of the relative ranks of various features common to a group of activities, profiles, locations, products, etc. In some embodiments, these relative ranks may then be used by the remote device 102 to aid prospective users in determining which activities or recommendations are more important to consider when selecting activities to engage in. For example, these rankings may incorporated (by either the remote device 102 or the host device 112) into web pages that allow consumers to use these received rankings for sorting through products based on matches to the user's profile by the recommendation system.

In some embodiments, the host device 112 may include a natural language processing system 122. The natural language processing system 122 may include a natural language processor 124, a rank notifier 126, and a sentiment ranker 130. The natural language processor 124 may include numerous subcomponents, such as a tokenizer, a part-of-speech (POS) tagger, a semantic analyzer, and a syntactic analyzer. An example natural language processor is discussed in more detail in reference to FIG. 2.

In some embodiments, the sentiment ranker 130 may be configured to features based on an analysis of the sentiment associated with ingested and annotated reviews. In addition, the rank notifier 126 may be connected to the sentiment ranker module 130 and may serve to notify a user at the remote system 102 (e.g., via the rank notification receiver module 111) of the relative ranks of the suggestions or recommendations.

In some embodiments, the natural language processing system 122 may further include a search application (not shown). The search application may be implemented using a conventional or other search engine, and may be distributed across multiple computer systems. The search application may be configured to search one or more databases or other computer systems for profiles or reviews that are related to a target group of individuals or activities. For example, the search application may be configured to search a corpus of information related to reviews previously submitted by the submission module 110 in order to identify additional relevant reviews and profiles of those who submitted the reviews.

While FIG. 1 illustrates a computing environment 100 with a single host device 112 and a single remote device 102, suitable computing environments for implementing embodiments of this disclosure may include any number of remote devices and host devices. The various modules, systems, and components illustrated in FIG. 1 may exist, if at all, across a plurality of host devices and remote devices. For example, some embodiments may include two host devices. The two host devices may be communicatively coupled using any suitable communications connection (e.g., using a WAN, a LAN, a wired connection, an intranet, or the Internet). The first host device may include a natural language processing system configured to ingest and annotate product reviews, and the second host device may include a software module configured to compare and rank product features based on the ingested product reviews.

It is noted that FIG. 1 is intended to depict the representative major components of an exemplary computing environment 100. In some embodiments, however, individual components may have greater or lesser complexity than as represented in FIG. 1, components other than or in addition to those shown in FIG. 1 may be present, and the number, type, and configuration of such components may vary.

Figure 2:
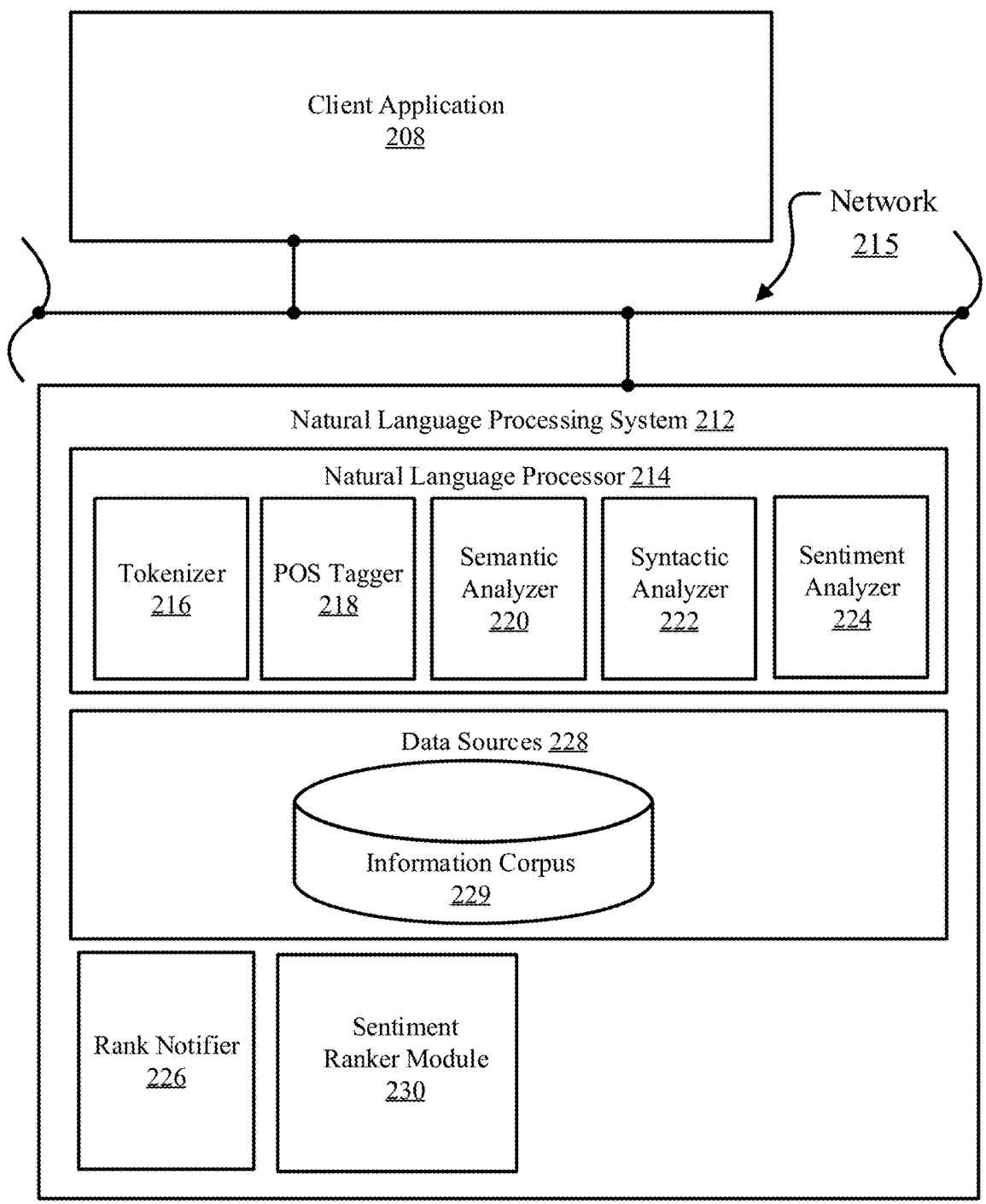
FIG. 2 illustrates a block diagram of an exemplary architecture, including a natural language processing system, configured to identify significant features and context in electronic content, in accordance with embodiments of the present disclosure.

Referring now to FIG. 2, shown is a block diagram of an exemplary architecture 200, including a natural language processing system 212, configured to use product reviews to rank product features, in accordance with embodiments of the present disclosure. In some embodiments, a remote device (such as remote device 102 of FIG. 1) may submit electronic documents, webpages, social media feeds, etc (containing information to be analyzed to determine if conditions for a trigger event or trigger condition have occurred) to the natural language processing system 212 which may be housed on a host device (such as host device 112 of FIG. 1). Such a remote device may include a client application 208, which may itself involve one or more entities operable to generate or modify information in the webpages that are then dispatched to a natural language processing system 212 via a network 215.

Consistent with various embodiments, the natural language processing system 212 may respond to electronic document submissions sent by the client application 208. Specifically, the natural language processing system 212 may analyze a received product reviews to aid in the analysis of the relative importance of product features for consumer consideration. In some embodiments, the natural language processing system 212 may include a natural language processor 214, data sources 228, a rank notifier 226, and a sentiment ranker 230.

The natural language processor 214 may be a computer modules that analyzes the received webpages, social media feeds, electronic documents, etc. The natural language processor 214 may use various techniques for analyzing electronic documents (e.g., syntactic analysis, semantic analysis, etc.). The natural language processor 214 may be configured to recognize and analyze any number of natural languages. In some embodiments, the natural language processor 214 may parse passages of the documents. Further, the natural language processor 214 may include various modules to perform analyses of the information in the processed items. These modules may include, but are not limited to, a tokenizer 216, a part-of-speech (POS) tagger 218, a semantic analyzer 220, a syntactic analyzer 222, and sentiment analyzer 224.

In some embodiments, the tokenizer 216 may be a computer module that performs lexical analysis. The tokenizer 216 may convert character strings into ordered sets of tokens. A token may be a sequence of characters included in an electronic document and classified as a meaningful representation. In some embodiments, the tokenizer 216 may identify lexemes in a received characters string and categorize them as tokens. Further, in some embodiments, the tokenizer 216 may identify text boundaries in an electronic document and divide any text passages within the document into their component text elements, such as words, phrases, and punctuation marks.

Consistent with various embodiments, the POS tagger 218 may be a computer module that annotates words in passages based on their respective parts of speech (e.g., verbs, adverbs, nouns, possessive markers, conjunctions, pronouns, etc.). The POS tagger 218 may read a passage or other text in natural language and annotate each word or token a part of speech. The POS tagger 218 may determine the part of speech to which a word (or other token) corresponds based on the definitions and context. The context of a word may be determined based on its relationships with associated words in a phrase, sentence, or passage. In some embodiments, the context of a word may be dependent on one or more previously analyzed electronic documents (e.g., the content of one document may shed light on the meaning of text elements in another document, particularly if they are reviews of the same item). In some embodiments, the POS tagger 218 may tag or otherwise annotate tokens of a passage with part of speech categories. These annotated tokens may then be analyzed by other modules of the natural language processing system 212.

In some embodiments, the semantic analyzer 220 may be a computer module that is configured to identify semantic relationships between tokens. In some embodiments, the semantic relationship identifier 220 may discover functional dependencies and other semantic relationships between tokens.

Consistent with various embodiments, the syntactic analyzer 222 may be a computer module that is configured to identify syntactic relationships between tokens. The syntactic relationship identifier 222 may rely on formal or informal grammar rules to identify the grammatical structure of sentences (e.g., which words modify which other words, which noun is the object of a verb, etc.).

Consistent with various embodiments, the sentiment analyzer 224 may be a computer module that is configured to identify and categorize the sentiments associated with tokens of interest. In some embodiments, the sentiment analyzer may be configured to identify, within text passages, and annotate keywords that are preselected as high quality indicators of sentiment polarity (e.g., indicators of positive sentiment could include brilliant, excellent, or fantastic). Various tools and algorithms may be used the sentiment analyzer 224 as are known to those skilled in the art (e.g., Naïve Bayes lexical model).

In some embodiments, the natural language processor 214 may be a computer module that may parse a document and generate an associated data structures for one or more portions of the parsed document. For example, in response to receiving a set of reviews from a website that includes a collection of consumer reviews at the natural language processing system 212, the natural language processor 214 may output parsed text elements from the product reviews as data structures. In some embodiments, a parsed passage may be represented in a graph structure, such as a parse tree.

In some embodiments, the parsed outputs of the natural language processor 214 may be stored as an information corpus 229 in one or more data sources 228. In some embodiments, data sources 228 may include data warehouses, document repositories, and information corpora. The information corpus 229 may enable data storage and retrieval. In some embodiments, the information corpus 229 may store standardized and consistent copies of the ingested and parsed reviews. Data stored in the information corpus 229 may be organized specifically to address the purpose of the system's analysis of that data. For example, the information corpus 229 may store the ingested reviews based on groups of related items (e.g., products of the same type, similar activities, etc) in order to make ranking features associated with the items easier. In some embodiments, the information corpus 229 may be a relational database.

In some embodiments, the natural language processing system 212 may include a sentiment ranker module 230. The sentiment ranker module 230 may be a computer module that is configured to generate sentiment scores for specific forms of item features based on the analysis of annotated reviews. The sentiment ranker module 230 may be further configured to rank the item features based on these sentiment scores.

The rank notifier 226 may be a computer module that is configured to notify users of item features rankings determined by the sentiment ranker module 230. In some embodiments, the rank notifier 226 may communicate with a rank notification receiver module (such as module 111 of FIG. 1).

Figure 3:
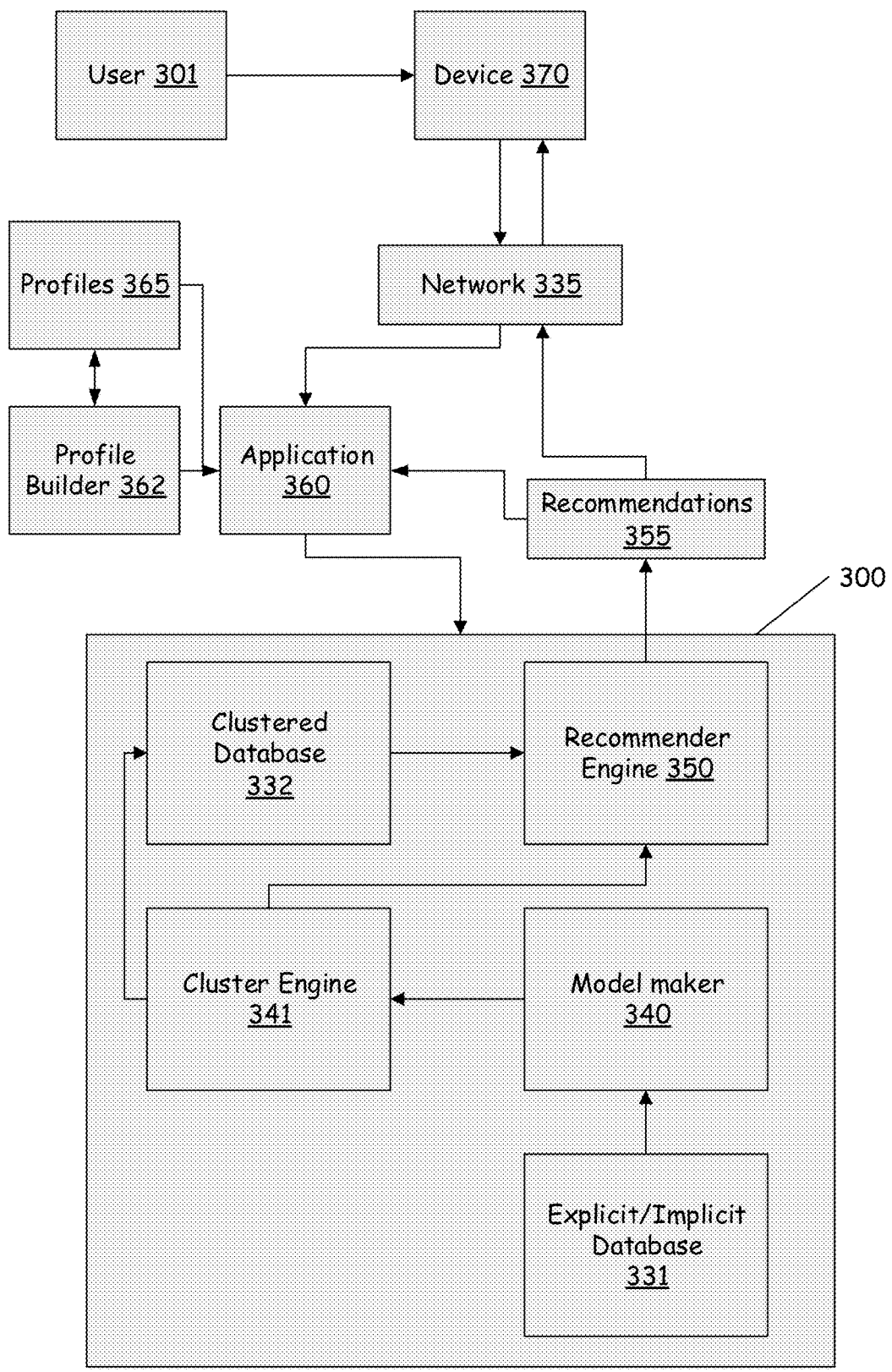
FIG. 3 is a diagrammatic representation recommender system and application according to illustrative embodiments of the present disclosure.

FIG. 3 schematically shows a recommender system 300 operating to provide recommendations 355 to users such as user 301 that may access the recommender system 300 through an application, such as application 360 using a device 370 according to illustrative embodiments. However, any available recommender system may be used. As used herein, a user can be an individual or a group of individuals. Recommender system 300 in some embodiments, comprises an "explicit-implicit database" 331 comprising explicit and/or implicit data acquired responsive to preferences exhibited by a population of users 301 for items in a catalog of items. Recommender system 300 may comprise a model maker 340 and a cluster engine 341 that cooperate to cluster related catalog items in catalog clusters and generate a clustered database 332. A recommender engine 350 recommends catalog items from catalog clusters in clustered database 332. The content of the items in clustered database can vary based on the particular implementation of the application 360. In some embodiments, the catalog items adjust or are augmented based on information received or determined by the natural language processing system of FIGS. 1 and 2 discussed above.

Device 370 may be any device in which a user 301 interacts with the application 360 through a network 335 to receive recommendations 355 for content and or activities. (e.g. mobile phone, tablet computer, desktop computer, music player, etc). In some embodiments, the application is installed on the user's device and accesses content through network 335. The application 360 is in one embodiment a consumer application 360 accessed by consumers or users 301 to purchase or obtain content and have that content delivered to them via network 335. In some embodiments, the application 360 is a travel or lifestyle application that allows the user to locate, find or otherwise review activities that they would desire to participate or engage in. The application 360 permits the user to search for content and activities, and also provides recommendations to the user about activities or content they may be interested in by communicating with a recommender system 300.

In some embodiments, the application 360 is configured to generate profiles 365 for the users of the recommendation system 300. Again, a profile 365 can be an individual profile or a group profile. The profile can be generated by profile builder 362. Examples of approaches to generating profiles for the users is discussed in greater detail below with respect to FIGS. 2-4. The profiles that are generated for use by the recommender system 300 can be customized based on the particular end use of the application. That is, for example, if the application is configured to provide travel recommendations then the profiles can be customized or tilted towards travel interests. In some embodiments, the application 360 does not generate the profiles itself, but acquires them from external sources that provide profiles for users or groups. In some embodiments, the profiles can be generated by the profile builder 362 and also obtained from outside sources. The profiles 365 can be stored in a profile store 366. Profile store 366 may be any type of storage system that can store profile information of individuals and groups. Each profile 365 is stored as a separate profile from other profiles 365 in the profile store.

Explicit data optionally comprised in explicit-implicit database 331 includes information acquired by recommender system 300 responsive to explicit requests for information submitted to users 301 in the population. These requests can be obtained in one embodiment from the user 301 when the user generates their personal profile with the application or first interacts with the device 370. Explicit requests for information may comprise, for example, questions in a questionnaire, requests to rank a book or movie for its entertainment value, requests to express an opinion on quality of a product, or requests to provide information related to likes and dislikes. Implicit data in the explicit-implicit database 331 can includes data acquired by the recommender system 300 responsive to observations of behavior of users 301 in the population that is not consciously generated by an explicit request for information. For example, implicit data may comprise data responsive to determining how the user uses content displayed by the device 370.

Model maker 340 processes explicit and/or implicit data comprised in explicit-implicit database 331 to implement a model for representing catalog items that represents each of the catalog items by a representation usable to cluster the catalog items. Cluster engine 341 processes the representations of the catalog items provided by model maker 340 to generate "clustered database" 332 in which the plurality of catalog items is clustered into catalog clusters, each of which groups a different set of related catalog items. While FIG. 3 schematically shows explicit-implicit database 331 as separate from clustered database 332, clustered database 332 may be comprised in explicit-implicit database 331. To generate clustered database 332, cluster engine 341 may, for example, simply mark records in explicit-implicit database 331 to indicate clusters with which the records are associated.

Any of various models for providing representations of catalog items and methods of processing the representations to cluster the catalog items and generate clustered database 332 may be used in practice of an embodiment of the invention. Model maker 340 may for example generate representations of catalog items that are based on feature vectors. Optionally, model maker 340 represents catalog items by vectors in a space spanned by eigenvectors, which are determined from a singular value decomposition (SVD) of a "ranking matrix" representing preferences of users 301 for the catalog items. Model maker 340 may represent catalog items by trait vectors in a latent space determined by matrix factorization of a ranking matrix. However, other methods may be employed.

Cluster engine 341 optionally clusters catalog items in a same catalog cluster if same users exhibit similar preferences for the catalog items. Optionally, cluster engine 341 uses a classifier, such as a support vector machine, trained on a subset of the catalog items to distinguish catalog items and cluster catalog items into catalog clusters. In some embodiments, the cluster engine 341 uses an iterative k-means clustering algorithm to cluster vectors representing catalog items and generate clustered database 332.

Figure 4:
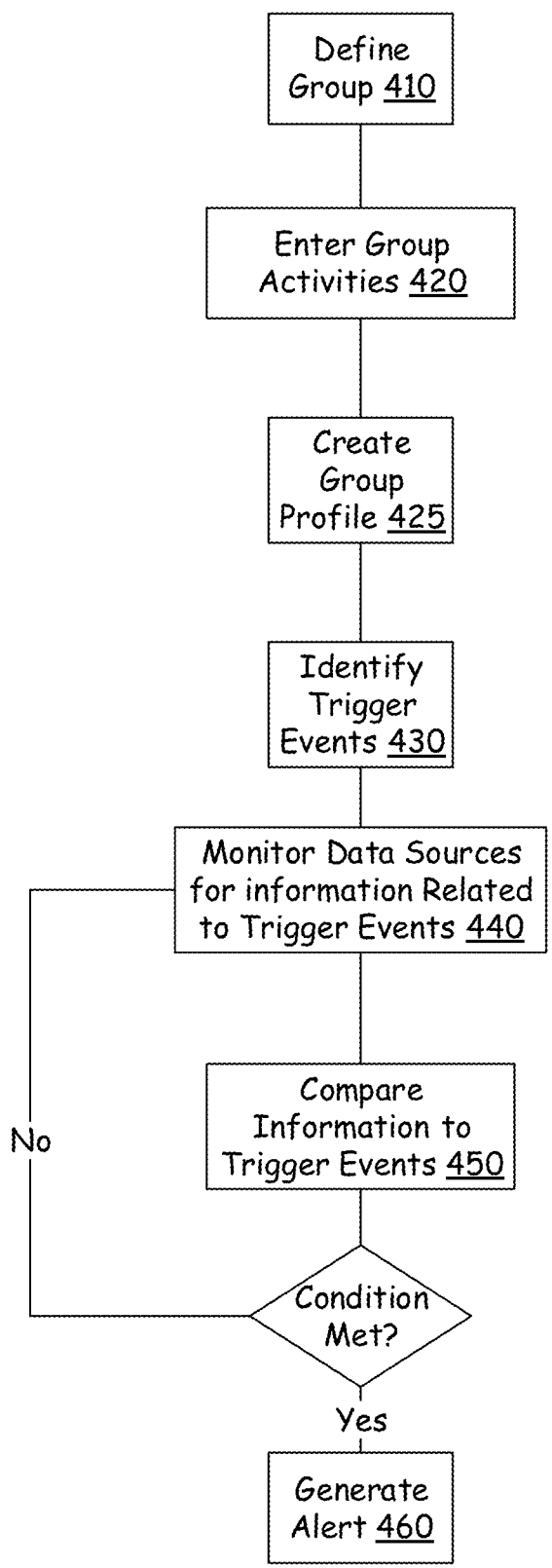
FIG. 4 is a flow diagram illustrating a process for making travel recommendations for a group according to illustrative embodiments.

FIG. 4 is a flow diagram illustrating a process for making travel recommendations for a group according to illustrative embodiments. The process discussed herein can be implemented using the natural language processing system discussed above with respect to FIGS. 1 and 2, and the recommender system discussed above with respect to FIG. 3. While FIG. 4 discusses travel recommendations, it should be noted that the process could be used for other situations where a group recommendation to engage in a certain activity can be envisioned.

The process begins by defining the group. This is illustrated at step 410. Typically, a group includes two or more individuals. However, in some embodiments, a group may only have a single member. One of the members of the group may access an application 360, and define the members of the group. In this approach the user may select the members of the group from a set of their contacts. These contacts may be contacts, for example, in a phone, electronic address book, social media site, etc. The selection of the members of the group can be done through an interface. In some embodiments, the group may be created automatically, by the application 360. In this approach the application 360 can analyze the contacts of the user to identify those contacts that logically should form a group. This analysis can consider the profiles 365 and profile data of each contact and based on information in the profiles 365 create the various groups.

In some embodiments, the group can be formed in an ad hoc manner. In forming the group via an ad hoc approach the application 360 can consider events occurring in the real world and convert those events into interests. For example, the application 360 may determine that there is a forest fire that is threatening a horse farm. The application 360 may have learned of this through its analysis of new websites. The application 360 then converts the knowledge about the forest fire and the horse farm into profile data that relates to interests in horses, owning a horse trailer, and the location of the fire. The application 360 then uses this profile data and the location data to form a group of individuals who may have no previous knowledge of each other.

Once the group has been formed the user who formed the group can provide information to the application 360 related to an activity or activities that the group desires to do. This is illustrated at step 420. This results in the creation of a group profile for the members of the group. This is illustrated at step 425. Steps 420 and 425 will be discussed together. For example, the user could indicate that the group desires to on a ski trip. However, the user also indicates that they also desire to go on the ski trip only when there is going to be powder at the resort, and the cost of the airfare is less than $400.00. The user can further provide more granularity to the application 360 by, for example, indicating further requirements on the trip, such as locations to avoid, cost of lift tickets, time restrictions, etc. This can be referred to as a set of conditions for the activity. In some embodiments, the application 360 can add additional limitations or restrictions to the request. For example, the application 360 can scan the profiles 365 of the members of the group and identify additional interests of the members of the group. These profiles 365 for the members can come from other applications such as social media applications, or information gleaned from contact information. During the scan the application 360 can identify, for example, musical interests of the members of the group as well as food preferences for the members of the group. The information contained in the profiles 365 of the members of the group can include interests that the members had not considered as being relevant to the desired trip they are looking at doing. In some embodiments, multiple group profiles 365 can be created for the members of the group to account for various differences in interests between the members of the group. In this approach, there may be three or more group profiles 365 for the group. Each of these group profiles 365 are additional group profiles 365 that are associated with the main group profile. These sub group profiles 365 can be created by the application 360 or by the user who created the group. As an example of these sub group profiles 365, while all members desire to go skiing, some members of the group have an interest in snowmobiling, while some members have an interest in snowshoeing. Separate sub group profiles 365 may be made for the members of the group who have these interests. Further, it should be noted that membership in one of the sub group profiles 365 may be, but does not have to be mutually exclusive. In some embodiments, the profile for the group already exists and the group profile is simply accessed from the source that currently holds the corresponding group profile.

Once the group and the profile for the group have been formed the application 360 works in the background to identify a set of trigger events that match the preferences and/or set of conditions defined for the group activity in the group profile. This is illustrated at step 430. The application 360 processes the information from the group profile into the set of trigger events. Trigger events are events that correspond to the determined preferences of the group. To form the trigger events the application 360 uses the information in the profile to identify locations and/or conditions that match the desired activity or purpose of the group. In the example of a ski trip, the application 360 identifies a number of ski resorts and determines the location of each these ski resorts. To identify the location of the ski resorts the application 360 may implement natural language processing of internet sites related to skiing. In some embodiments, the application 360 access a catalogue that includes information related to ski resorts. From this information related to location of the ski resorts, the application 360 generates the trigger events for the locations. In this example, the trigger events can include monitoring the weather at each location that was identified, and to trigger an alert if the weather indicates that there will be a snowfall of more than 12 inches expected. The application 360 can generate a second trigger event that monitors airfare between the location of the members of the group and each location determined for the ski resorts. As many ski resorts are in locations that are not served by regular air service, the application 360 can determine the airport or airports that are closest to the particular ski resort. In some embodiments, the user may have indicated in the group profile that they want a ski resort that is within a particular distance of an airport. In this instance the application 360 will generate the trigger for airfares to only those airports that are within the particular distance indicated by the user. Additional trigger events based on the information entered by the user can be generated by the application 360. The number of trigger events generated by the application 360 can be controlled by the user, or in some embodiments, controlled by the application 360. Further, depending on the type of activity desired, the number of triggers can vary. For example, a beach vacation may require more trigger events than a shopping trip to New York as the general conditions needed to make activity a success are more for the beach than shopping. (e.g. Beach could have airfare, weather, lodging, timing as the trigger events, whereas shopping may only have airfare and sales as trigger events.)

In some embodiments, the application 360 uses the profiles 365 for the members of the group to generate additional activities, sets of conditions for the activities, and trigger events for the activities. For example, the profile for the members of the group indicate that the members have an interest in a particular type of music, or a particular musical group. The application 360 can, based on this information, generate one or more trigger events for this particular interest. These trigger events are generated by the application 360 outside of the specific information provided by the user when defining/setting up the group profile. These trigger events are provided to alert the user to experiences that may be of interest to the members of the group outside of the primary reason for the creation of the group. When the group is an ad hoc group the application 360 can generate trigger events for the ad hoc group for events that relate to the reason the ad hoc group was formed. Using the example of the forest fire and the horse farm, the application 360 may create a trigger event for when the fire's edge is within a certain distance from the farm.

Once the trigger events have been defined for the group, the application 360 monitors a variety of electronic information sources in order to identify when a condition for a particular trigger event is met. This is illustrated at step 440. These information sources can include internet sites, blog posts, RSS feeds, social media platforms and posts, etc. Additional sources of information that can be monitored, can be based upon the particular trigger events that were generated. For example, if there is a trigger event related to weather then weather related information sources may be monitored. The application 360 may prioritize particular trigger events over other trigger events, such that only a portion or subset of the set of trigger events is initially monitored and compared. This may be done to preserve processing power or to enhance the overall efficiency of the application 360. The prioritization can be provided by the user, group, or the application. For example, the application 360 may prioritize the weather trigger event over the trigger event related to the cost of airfare. In this instance, the application 360 does not monitor or consider the airfare condition and trigger event until such time as the weather trigger event has occurred or the associated condition has been met. The application 360 can prioritize any number of trigger events. (e.g. the application can consider the three highest trigger events before considering the remaining trigger events, or can process each trigger event in their corresponding priority level). The application 360 may implement web crawlers, bots, interactive web crawlers, interactive bots or other approaches to extract the information from the sites that contain or publish the associated information. The extracted information is processed through a natural language processor to gain contextual knowledge about the information from the source. Returning to the weather based trigger event, the application 360 can understand based on the contextual knowledge that a large snowfall is expected at a particular location.

Following the extraction of the information from the information sources, the application 360 proceeds to compare the extracted information against the conditions related to the trigger event or events. This is illustrated at step 450. The application 360, for example, uses the tokens generated by the natural language processing system to determine if the generated tokens and analysis of the particular tokens meets the conditions for the trigger event. At this stage the application 360 can use logic rules or other analytical approaches to determine if the condition is met. It should be noted that any method for determining if a condition has been met can be used. For example, using the ski trip example, the application 360 could take a token or string of tokens representing a predicted snowfall of one foot and compare that to a trigger event for predicted snowfall of 12 inches or more and determine that the trigger event has been met, as 12 inches is equal to one foot.

If the conditions of the trigger events are met, (e.g. a particular amount of snow expected exceeds the threshold value, and the airfare is below a threshold value, and the resort is within the defined distance from the airport) the application 360 proceeds to send an alert to the user or members of the group. This is illustrated at step 460. The alerts can be sent to the user via email, text message, application 360 method or any other means for alerting the user. However, in some embodiments, the alert can be sent when a threshold number of the trigger events have been met. For example, an alert can be sent if the snow total expected exceeds the threshold, and the airfare is below the threshold cost, but the distance doesn't meet the required distance. The alert, in some embodiments, includes information associated with why the alert was generated. This information can include, for example, details about the event that alert is about as well as information as how to get to the event or book the event.

The user receives the alert from the application 360 and is then able to act on the alert. This is illustrated at step 460. In some embodiments, the alert includes information to book the event that caused the alert. For example, the alert could include a link or links to a website(s) to purchase tickets for the event, book travel to the event, etc. The user can then follow the provided links to complete the transaction. In some embodiments, the application 360 has prepopulated the data required to book the event. In this approach all the user has to do is complete the transaction by providing any missing information required. In some embodiments, the application 360 is capable of completing the entire booking process without the user providing any further information. In this embodiment, the user simply indicates that the wish to participate in the event, and the application 360 completes the entire booking process in the background.

Figure 5:
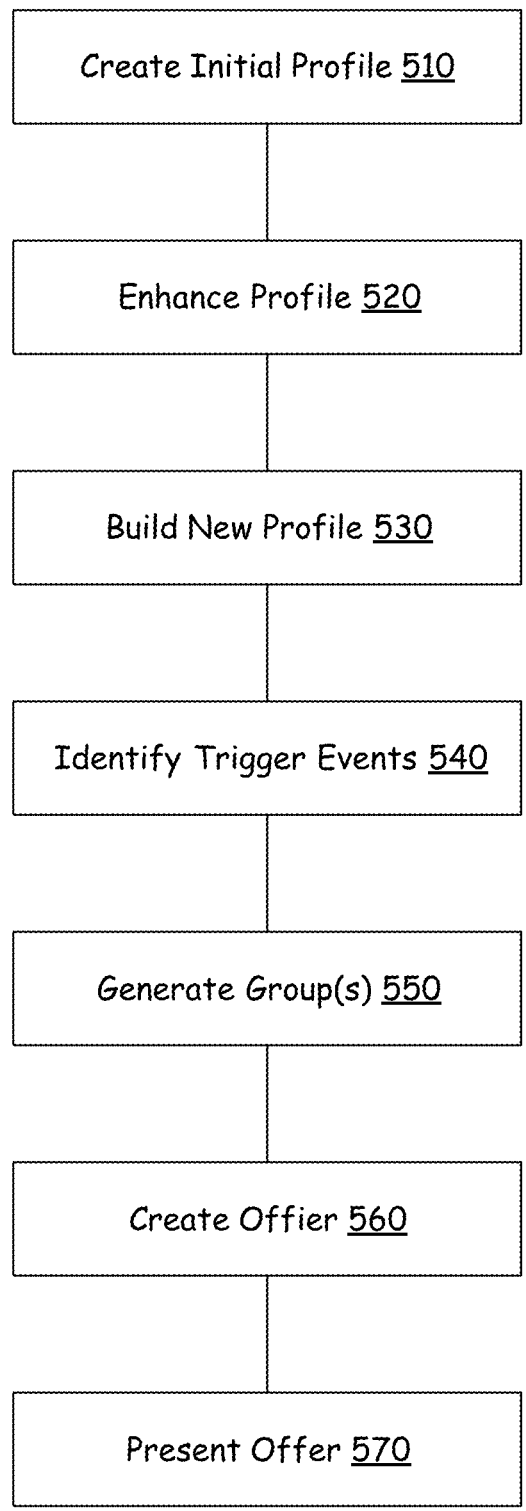
FIG. 5 is a flow diagram illustrating a process for forming a group of individuals who have similar interests according to illustrative embodiments.

FIG. 5 is a flow diagram illustrating a process for forming a group of individuals who have similar interests based upon a trigger event occurring, according to illustrative embodiments. The process discussed herein can be implemented using the natural language processing system discussed above with respect to FIGS. 1 and 2, and the recommender systems discussed above with respect to FIG. 3.

The process begins by creating a profile for the individuals who can form members of the groups. This is illustrated at step 510. At this step the user provides basic information to the application 360 that allows for the formation of a basic profile for the user. This information may include age, gender, name, location, contact information, their interests, hobbies etc. With this basic information the profile builder 362 builds the base profile for the user. In some embodiments, the profile builder 362 searches for profiles 365 that already exist for other users in the application 360 that are similar to the information that the user has entered. If a similar profile is found the profile builder 362 may use that similar profile as a base to generate the user's profile. However, in other embodiments the user's base profile is generated without concern for other users of application 360. The individuals interact with the application 360 through the user interface to provide the application 360 with basic information about the individual. In some embodiments, the application 360 may probe the user to provide more information based on the profile information entered. For example, the application 360 may identify that a particular interest or hobby can be further refined. The application 360 can then provide an interface for the user to provide further information that better refines the interest in the profile.

Once the user has entered in their basic profile information the application 360 proceeds to enhance the user's profile. This is illustrated at step 520. The application 360 enhances the user profile by accessing social networks related to the individual. The application 360 can query the users for information from the profiles 365 maintained by any number of social networks. In order to obtain this profile information from the social networks the user may be presented with an interface where they can enter in information related to the various social networks that they belong to. This interface can present to the user a list of known social networks, and ask the user to provide their credentials to each of the social networks that they wish to share information with the application 360. In other approaches the user merely provides the information necessary for the profile builder 362 to locate and access their profile on the social networks. The profile builder 362 access the user's profile and gathers their profile information from the corresponding social network. The profile builder 362 can use any means that is permitted by the social network to gather the profile information. This can, for example, include using application 360 programming interfaces exposed by the social network, or viewing the profile on the social network and scraping the data contained in the account.

The profile builder 362 may further gather information about the user from other sources outside of the social networks. For example, the profile builder 362 may search the computer or devices of the user for additional information related to the user that may be helpful in generating the profile for the user. The profile builder 362 may access a browser history for the user, the user's calendar, photos, documents, etc, and obtain information from these sources. This information may include the actual data from the sources, or may include metadata from the sources, such as location data or tags in a photograph. Further, the user can choose to provide the application 360, and hence the profile builder 362 information from non-social network sources. This can include information that is held by other companies, such as travel agencies, airlines, hotels, banks, etc. The profile builder 362 can access these sites of information to gather additional information that may be relevant to the generation of the enhanced profile for the user, such as travel plans, or bank balances.

Once the various information from the various sources of information have been gathered, the profile builder 362 proceeds to build a profile for the user with the application 360. This is illustrated at step 530. The profile builder 362 can use any method for building the profile from the information gathered from the various sources by the profile builder 362, and the information that was provided by the user in the creation of the initial profile. Once the profile is completed it is stored.

Following the completion of the generation of the profiles 365 for the users of the system, the application 360 monitors various sources of information to identify trigger events. This is illustrated at step 540. These trigger events can be events that the provider of the application 360 has determined to be conditions that they desire to cause an alert to be generated. For example, an airline may desire to have a trigger event when they have 10 empty seats on a particular flight to a specific definition. For example, the airline may determine that if there are 10 seats from Minneapolis to Cancun Mexico in February for sale less than 10 days prior to departure that there may be demand for this trip, but that individuals may not be aware of the excess capacity and may be interested in this trip. In another example, a bus company may have an unreserved bus that could be rented by a group if they were made aware of it. In yet another example a concert venue may have extra tickets for a show that they would like to sell. The application 360 can monitor for any number of trigger events that have been designated by the provider of the application 360. Further, in some embodiments, the application 360 can identify the trigger events on its own. In some embodiments, the users of the application 360 can create trigger events. For example, a group of people have rented a bus to go on a ski trip. However, they have a few empty seats left that they desire to fill. One of the members of this group can create a trigger event for the open seats on the bus for the ski trip.

When a trigger event is detected the application 360 proceeds to generate a group or groups that may be interested in the trigger event. This is illustrated at step 550. Each trigger event has a set of profile characteristics associated with it that can be matched to profiles 365 maintained by the application 360. The application 360 searches the profiles 365 to find individual members who have profiles 365 that indicate that they may be interested in the trigger event. For each individual identified the group association component looks for other individuals who match the profile of the trigger event, and also match profile of the particular individual. For example, the group association component may look at the individual's friend list and the profiles 365 associated with those friends to determine if any of those friends have profiles 365 that match the trigger event as well. Individuals that are determined to match the profiles 365 are then aggregated into a new group. Depending on the parameters of the trigger event, the size of the group may be capped. If the size of the group is capped the group association component of the application 360 may rank the individuals of the group based on performing a ranking of the matching of the profiles 365 of the members. This ranking may consider how close the profiles 365 of the individuals are to each other, such that profiles 365 that are more similar to the individuals are ranked higher. In this way individuals with closer profiles 365 are considered for the group. In some embodiments, the group association module can go beyond the profiles 365 of the friend list of the individual, and into the "friends of friends" and further to find profiles 365 of individuals that the individual does not know, but may have similar interests and profiles 365. Once a number of individual profiles 365 are found the group is formed. A number of groups may be formed at this step by the group association module. These multiple groups may be related to each other, may have some cross over in members between them, or may be completely separate memberships. In some embodiments, in identifying the individuals, the calendars of the individuals are considered. That is they are only selected if their calendar indicates that they are free during the time period of the associated activity.

Once the group has been formed an offer to the group can be created by the application 360. This is illustrated at step 560. In some embodiments, the application 360 may be pre-programmed with the offer to provide to the group. For example, an airline may have determined that if there are 10 seats to Cancun that the airline would offer the group a 30% discount on the going airfare to a group of 5 people. In some embodiments, the application 360 can alert an administrator (or other individual) associated with the application 360 that a particular trigger event has occurred, and that one or more groups have been identified that meet the conditions of the trigger event. The administrator can then create an offer at that time for the groups. The administrator can also, in some embodiments, view the profiles 365 of the groups in determining what offer to make to the groups. In some embodiments, the application 360 can create an offer package for the group of multiple items. In these embodiments, the application 360 can create, for example, a travel package of airfare, hotel, lift tickets, etc, for the group that creates an entire trip. The application 360 can use the profiles 365 of the members of the group to select the various items to offer from the catalogue. To identify the items that can be grouped together for the offer the application 360 may pass the group profile through the recommender system.

Once the offer is prepared it is provided to the members of the group. This is illustrated at step 570. The members of the group can then act upon the offer. This is illustrated at step 580. In some embodiments, the offer requires the group to act on the offer as a group and not as individuals. The application 360 can further update the profiles 365 of the members to indicate whether the offer was accepted by the group or rejected (e.g. not acted upon) by the group. This information allows for the application 360 to refine its models as to which groups are provided with the offers. Further, when the offer is accepted by one group, the offer can be rescinded from the other groups that were offered the offer.

Figure 6:
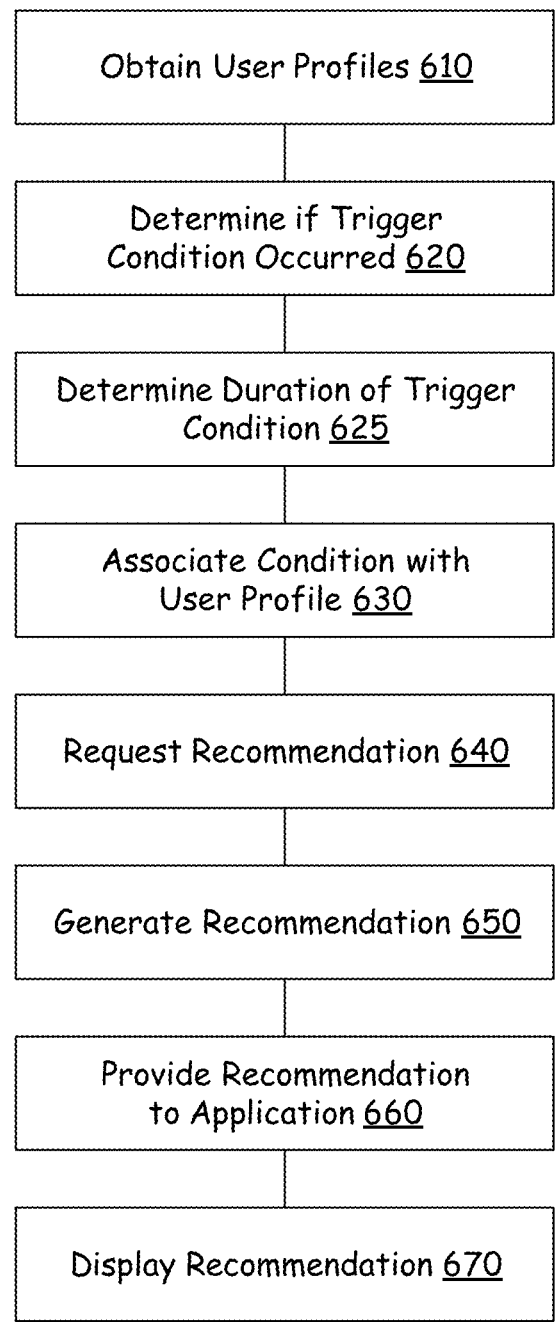
FIG. 6 is a flow diagram of a process for providing recommendations that go against a currently existing profile for an individual or a group according to illustrative embodiments.

FIG. 6 is a flow diagram of a process for providing recommendations that go against a currently existing profile for an individual or a group, according to illustrative embodiments. A contrary recommendation is provided to the user when there is other information available to the application 360 that indicates that the normal profile is inappropriate. Conditions where the current profile is not appropriate could arise from, for example, an injury to the person, a change in dietary preferences, a change in weather, a religious holiday, a change in the location, etc. Typically, these conditions are only temporary in nature, and as such, do not require the regeneration or wholesale updating of the user's profile, as the temporary nature of the condition means that the original profile will again be relevant. The process discussed herein can be implemented using the natural language processing system discussed above with respect to FIGS. 1 and 2, and the recommender systems discussed above with respect to FIG. 3.

The process begins by accessing or obtaining the user's profile. This is illustrated at step 610. The user's profile is in some embodiments, obtained from the profile store. The profile can either be an individual profile or a group profile. This profile can be generated by any method of generating a user profile. In some embodiments, the profiles 365 are the profiles that were generated for use by the application 360 in FIG. 4 or 5. In some embodiments, the profiles 365 are generated according to the processes discussed above. If the user does not have a profile in profile store the profile can be generated at this step.

Once the profile has been accessed the application 360 examines the data behind the profile to determine if a condition has occurred that could indicate that the current profile is not appropriate for making recommendations. This is illustrated at step 620. At this step the application 360 processes the data from the various data sources to determine if there is an indication that a trigger condition has occurred to the user. These trigger conditions can be predefined by the application 360, or they may be learned using machine learning techniques. For example, during a scrape of the user's social media feed, the application 360 finds a post that indicates that the individual was recently at the hospital for a sprained ankle, and will be unable to run for 2 weeks. This application 360 determines that this post is a trigger condition that has occurred. In another example, the application 360 during a scrape finds a post from a member of a group that indicates that the group has spent the past five days eating pub food. This post would be considered a trigger condition. Again, the application 360 using the natural language processing system can identify any number of trigger conditions. The trigger conditions are annotated or tagged with information that indicates what activities are incompatible with the trigger condition. In the example of the sprained ankle, activities that involve running or extensive walking would be noted as incompatible, while stationary or minimal walking activities would be considered compatible. In the example of eating pub food for 5 days straight, recommendations for high fat high caloric restaurants can be considered incompatible with this condition, while healthy eating establishments would be considered compatible.

Following the determination of a trigger condition the application 360 determines the duration of the trigger condition. This is illustrated at step 625. The application 360 can use the natural language processing system determine the duration of the trigger condition. For example, in the case of the sprained ankle, the application 360 would determine that the trigger condition will last 2 weeks based off of the information in the post. In some instances, the application 360 accesses other sources of information to determine the duration of the trigger condition. For example, if the post about the sprain did not include how long they would be out, the application 360 can access the internet or other sources, and determine how long it usually takes to recover from a sprained ankle. With this information, the application 360 would assign the trigger condition the determined duration for the condition.

These determined trigger conditions are stored in the profile store along with the associated profile. This is illustrated at step 630. This association allows the recommender engine to acquire the trigger conditions as well as the associated profile. In some embodiments, the trigger conditions are added into the user profile. In some embodiments, a pointer to the trigger conditions is inserted in the profile, and the trigger conditions exist as a separate part of the profile store. Also stored with the trigger conditions is an indication of a duration of the trigger condition. Again, it should be noted that the trigger conditions does not modify the underlying profile.

The application 360 proceeds to operate as normal, and at some point after the formation of the trigger condition a recommendation is requested. This is illustrated at step 640. This recommendation request could come from the application 360 responding to a trigger event, such as the trigger events discussed above. In some embodiments, the user may ask for a recommendation from the application 360. In other embodiments, the user may request or receive a recommendation from other applications.

The recommendation is generated by recommender system in response to the recommendation request. This is illustrated at step 650. The recommender system generates the recommendation based on the information contained in the profile. This recommendation or list of recommendations can be passed to the application 360. In some embodiments, the recommendation system uses the trigger conditions to filter recommendations that are provided to the application 360. For example, if the profile indicates that the individual likes to run, the recommender system may generate as a top recommendation a location that has fantastic running conditions and locations. However, because the individual has recently sprained their ankle this recommendation is less likely to be valuable to them. The recommender engine can access the trigger conditions associated with the profile to augment the profile. Using the trigger conditions the recommender engine can filter out recommendations that are incompatible with trigger conditions.

The recommendations are provided to the application 360. This is illustrated at step 660. The application 360 can review the recommendations that are provided by the recommender system to determine if the recommendations are appropriate for the user. The application 360 can access the trigger conditions associated with the profile and compare the recommendations to the trigger conditions. If recommendations are found that are not compatible with the trigger conditions, the application 360 can filter these recommendations from the output that is generated and presented to the user. This application 360 can perform this filtering regardless if the recommendation system employed the filters as well. The user is then presented with recommendations that take into account the restraints that are caused by the trigger condition. The display of the recommendations to the user is illustrated at step 670.

Figure 7:
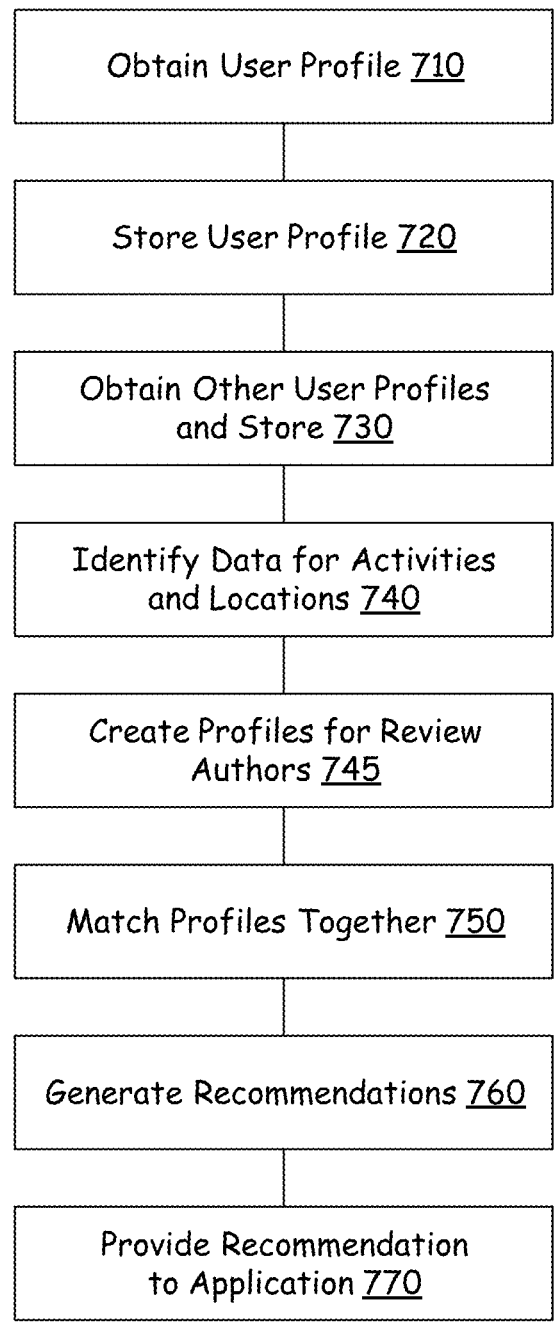
FIG. 7 is a flow chart illustrating a process of providing proactive recommendations according to illustrative embodiments.

FIG. 7 is a flow chart illustrating a process, according to embodiments, of providing proactive recommendations of recreational activities. The recommendations can be based on matching of stored detailed information and publicly available data, historical data about an individual or groups of individuals, with available public and licensed information about activities within a particular distance range from a given location, taking several external factors in consideration, such as the location, the date, the current weather, travel warnings, and special events/offers taking place within a predetermined range of a particular location.

The system will also review the feedback from licensed or publicly available data feedback from each activity to learn about the quality of the recommended activity, its popularity, and the compatibility of the activity based on the insights provided by the review data. The system leverages the wisdom of the crowds, found as unstructured data across the Internet (i.e., to find ideal activities, and provides context on the activity itself (i.e. an activity might be popular but has bad reviews), and context related to the user (i.e. individuals similar to you prefer activity x).

The system extracts insight into the individual and his companion's information, and separately, it extracts insight into available activities, based on the available data. The system then acts as a broker, linking each individual or group of individuals, with the ideal available set of activities. Both parties (individual and activity provider) benefit from enabling them to find each other. The individual is able to do the activities that they would enjoy the most during a limited window of time at a location (either familiar or unfamiliar, local or remote, etc.), and the activity provider benefits by increasing business based on customer affinity and positive feedback from previous customers.

The system is in some embodiments adaptable, self-learning and self-tuning, to increase the accuracy of its recommendations over time. The system receives feedback from its users, after a recommendation is suggested, or the recommendation is taken by the user (e.g. through "I recommend" feedback button). This information is then provided back to the recommender engine for tuning of the recommendations that are provided.

The system enables the users (individuals using the application) to provide their profile information. This is illustrated at step 710. This can be done with, for example, a simple questionnaire, or with getting their data feed from their social network of their choice (e.g. Facebook, Twitter, etc.). The processes discussed above with respect to FIGS. 4-6 for generating a profile can be used at this step.

The system stores key information that can be used to match individuals as against available activities. This is illustrated at step 720. Some of the data obtained can include things, places or events that the individuals indicated or were determined by the profile builder that they like, personality insights from their write ups, aggregation of data obtained via background images from their pictures (beach photos, nature photos, sport activities, etc.). This information can is stored with the profiles in the profile store.

The system will store the same information above, for other users of the system, and can indicate that they're part of the same travel group as other users. This is illustrated at step 730. This will generate an additional "travel group profile", which as its own entity, will have its own weighted set of aggregated interests, personality, dislikes, etc. Additional members of a travel party can be added by providing a profile with public data (e.g. Twitter, Facebook, blogs, social media, etc.), so the system can automatically determine their personality and other insights, and add them as part of the "travel group profile". Groups can also be either pre-designated by the user or cognitively defined through the user's regular social media contacts/friends). The size of the group can be limited to a threshold number of members. For example, the group may be limited to 5 people. However, a travel group can have any number of members. Again the group may be formed manually by one of the users or automatically by the system based a threshold number of common interests between users.

The system identifies the key metadata about activities at different locations and stores this information. This is illustrated at step 740. The identification of locations and activities can be done using the processes discussed above with respect to FIGS. 4-6. Each activity will have its own logical profile that will determine its popularity, rating, and affinity with potential individuals. Each activity can have a corresponding profile in the profiles store 365. Each activity can have a "quality rating" to prevent the recommendation engine 350 from suggesting activities with a high consensus of low quality, and also adjusting a highly popular activity that may not be as good quality (i.e. tourist traps). The system can determine the sentiment of written text, sound or video about a particular activity, and aggregate this information in the "quality ranking" method.

The system can also create profiles for the authors of the reviews. This is illustrated at step 745. The system can, for example, store metadata information about authors of articles, reviews, or blogs about a particular activity, and provide personality insights and other methods to determine a profile for those authors and/or reviewers, and their rating/opinion of that particular activity, to be used as a factor to determine affinity of the activity with individuals with similar interests. It will also determine this rank information for other activities talked about by this author. These are stored as author profiles within the profile store.

The system identifies matches of the user profile and/or the "travel group profile" with other similar user profiles, "activity profiles" and "author profiles". This is illustrated at step 750. The system can then assign a rank of similarity between these users. This ranking system will allow the system to uncover activities that may be of interest to users based on people similar and with similar interests that may not have been suggested otherwise.

The system determines and provides a list of suggested activities (or recommendations) for any user of the application 360, based on their current location. This is illustrated at step 760. The system matches the travel profile, or travel group profile, with activities that are in close proximity to their current (or specified) location. The activities will be determined based on the type of activity (food, sport, nightlife, etc.). For the specified type of activity, the system searches for available options within a distance range of the user's location. The distance range can be input by the user when creating their corresponding profile, or can be determined by the application/system. For each activity determines if this is a feasible activity based on the date/time, season and weather. For example: Is the activity only open during summer? Is a concert that is during the weekend? Is there a storm coming that may affect the suggested activity? In some embodiments, the system can determine a weighed recommendation, by matching the available pool of high "quality ranking" activities that matches the user's interests, likes, and historical information (similar activities in other places). In some embodiments, the system adds as a factor for consideration of the recommendation, affinity with other users and "authors" that have recommended the activity.

The system returns to the application 360 a result list of recommendations. This is illustrated at step 770. The recommendations can include the probability that the individual/travel group will like the specific activity (e.g. Activity A 90% chance; Activity B-85% chance). The individual/individual group will have the chance to provide immediate feedback (e.g. "do not recommend again"), and/or experienced feedback (e.g. "I recommend", "did not like", "more recommendations like this", etc.). Individual groups will also have the chance to provide feedback as individual and vote to determine what is the consensus of the group. The individual can also provide their feedback in real time to provide better insights into the time and location of when the individual had positive or negative experience during their trip, and allow the system to replicate the highlights of their trip in future travel occasions. This information can be fed back to the recommendation system 300 and/or into the associated profiles for the corresponding activities, users, authors, etc. in order to update the corresponding information.

Figure 8:
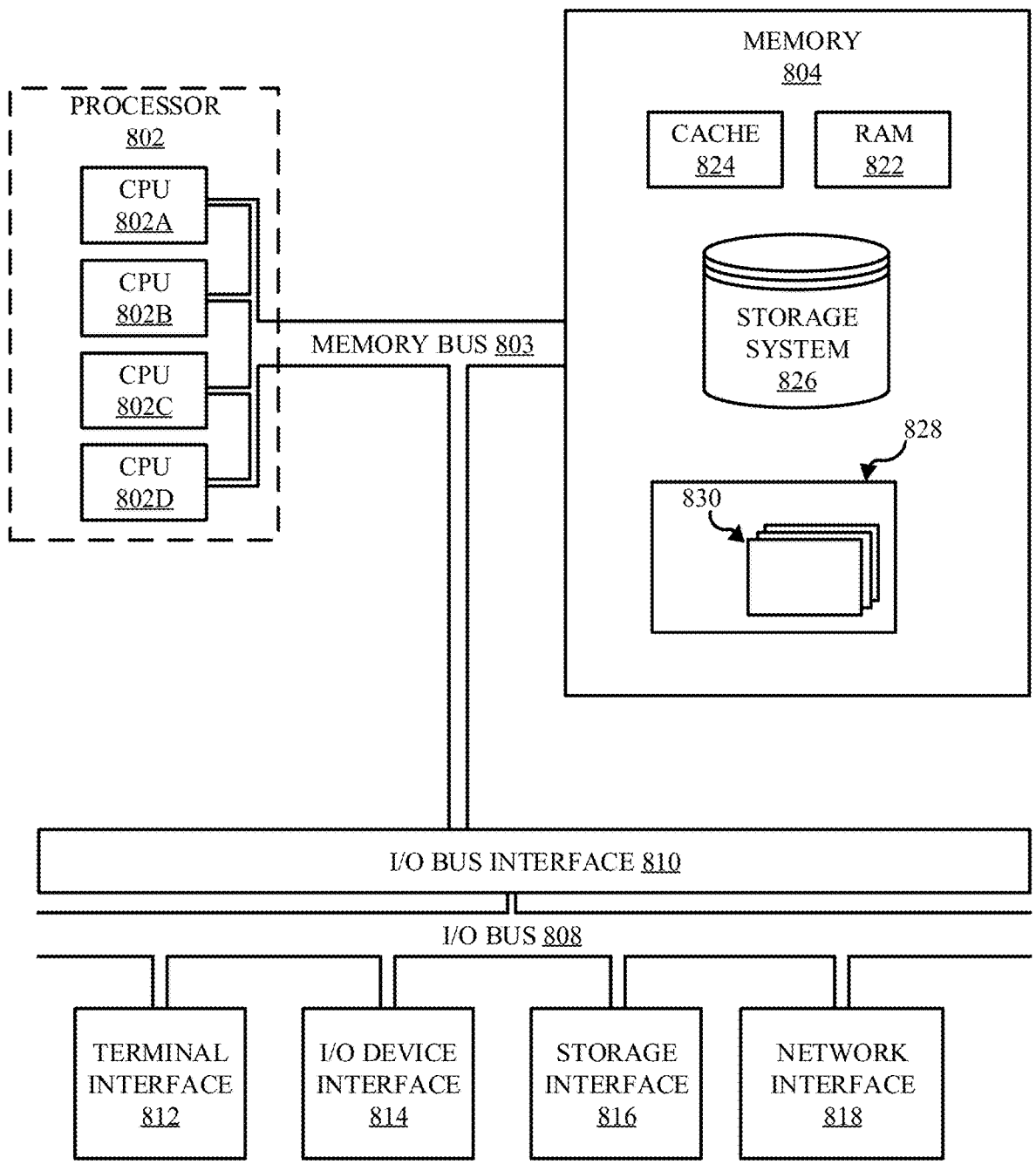
FIG. 8 is a block diagram illustrating a computing system according to one embodiment.

Referring now to FIG. 8, shown is a high-level block diagram of an example computer system 801 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 801 may comprise one or more CPUs 802, a memory subsystem 804, a terminal interface 812, a storage interface 816, an I/O (Input/Output) device interface 814, and a network interface 818, all of which may be communicatively coupled, directly or indirectly, for inter-component communication via a memory bus 803, an I/O bus 808, and an I/O bus interface unit 810.

The computer system 801 may contain one or more general-purpose programmable central processing units (CPUs) 802A, 802B, 802C, and 802D, herein generically referred to as the CPU 802. In some embodiments, the computer system 801 may contain multiple processors typical of a relatively large system; however, in other embodiments the computer system 801 may alternatively be a single CPU system. Each CPU 802 may execute instructions stored in the memory subsystem 804 and may include one or more levels of on-board cache.

System memory 804 may include computer system readable media in the form of volatile memory, such as random access memory (RAM) 822 or cache memory 824. Computer system 801 may further include other removable/non-removable, volatile/non-volatile computer system storage media. By way of example only, storage system 826 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 804 can include flash memory, e.g., a flash memory stick drive or a flash drive. Memory devices can be connected to memory bus 803 by one or more data media interfaces. The memory 804 may include at least one program product having a set (e.g., at least one) of program modules that are configured to carry out the functions of various embodiments.

Although the memory bus 803 is shown in FIG. 8 as a single bus structure providing a direct communication path among the CPUs 802, the memory subsystem 804, and the I/O bus interface 810, the memory bus 803 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 810 and the I/O bus 808 are shown as single respective units, the computer system 801 may, in some embodiments, contain multiple I/O bus interface units 810, multiple I/O buses 808, or both. Further, while multiple I/O interface units are shown, which separate the I/O bus 808 from various communications paths running to the various I/O devices, in other embodiments some or all of the I/O devices may be connected directly to one or more system I/O buses.

In some embodiments, the computer system 801 may be a multi-user mainframe computer system, a single-user system, or a server computer or similar device that has little or no direct user interface, but receives requests from other computer systems (clients). Further, in some embodiments, the computer system 801 may be implemented as a desktop computer, portable computer, laptop or notebook computer, tablet computer, pocket computer, telephone, smart phone, network switches or routers, or any other appropriate type of electronic device.

It is noted that FIG. 8 is intended to depict the representative major components of an exemplary computer system 801. In some embodiments, however, individual components may have greater or lesser complexity than as represented in FIG. 5, components other than or in addition to those shown in FIG. 8 may be present, and the number, type, and configuration of such components may vary.

One or more programs/utilities 828, each having at least one set of program modules 830 may be stored in memory 804. The programs/utilities 828 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 828 and/or program modules 830 generally perform the functions or methodologies of various embodiments.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
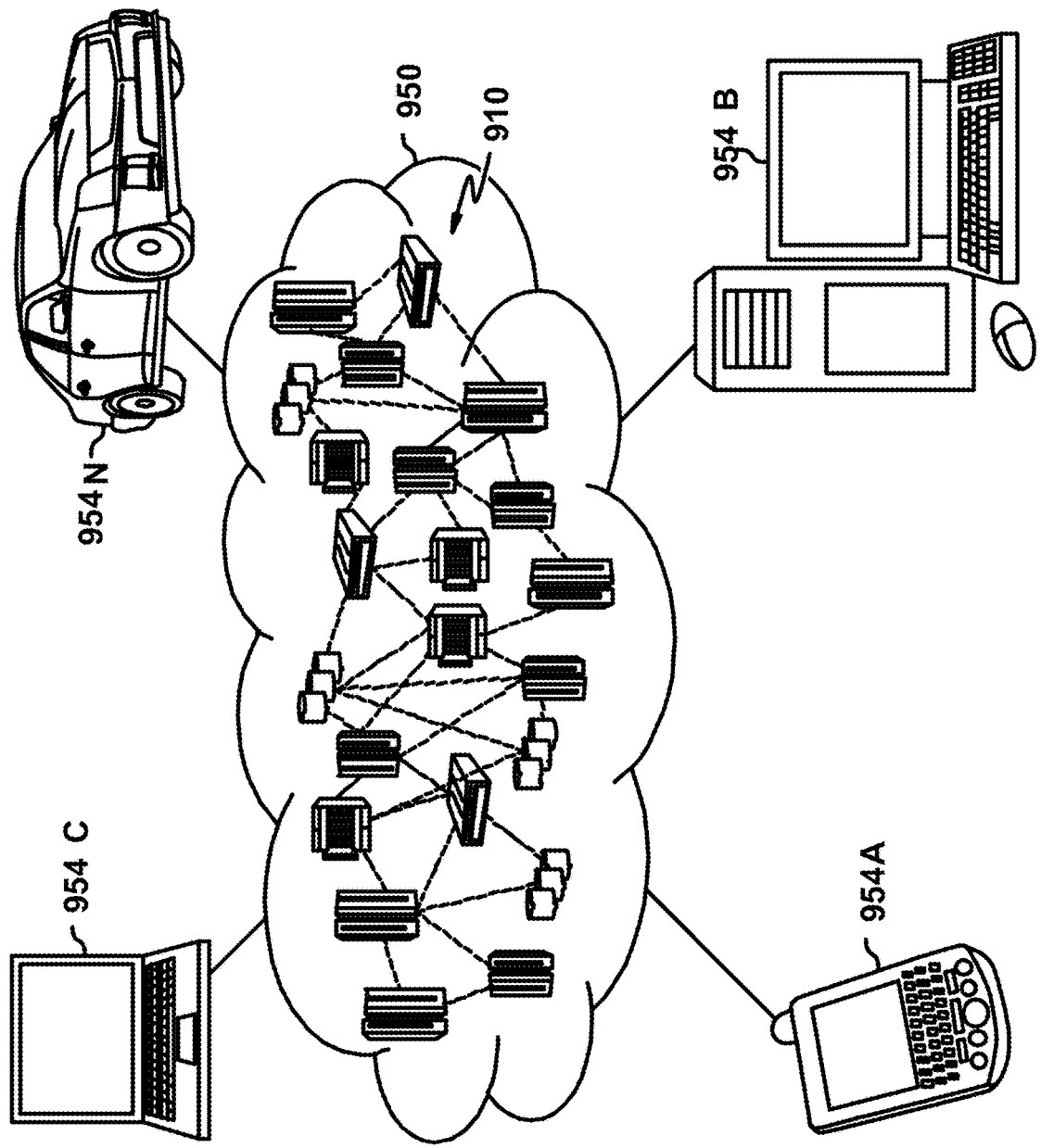
FIG. 9 is a diagrammatic representation of an illustrative cloud computing environment.

The systems 100, 200, 300 may be employed in a cloud computing environment. FIG. 9, is a diagrammatic representation of an illustrative cloud computing environment 950 according to one embodiment. As shown, cloud computing environment 950 comprises one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 10 and cloud computing environment 950 may communicate with any type of computerized device over any type of network and/or network addressable connection (e.g., using a web browser).

Figure 10:
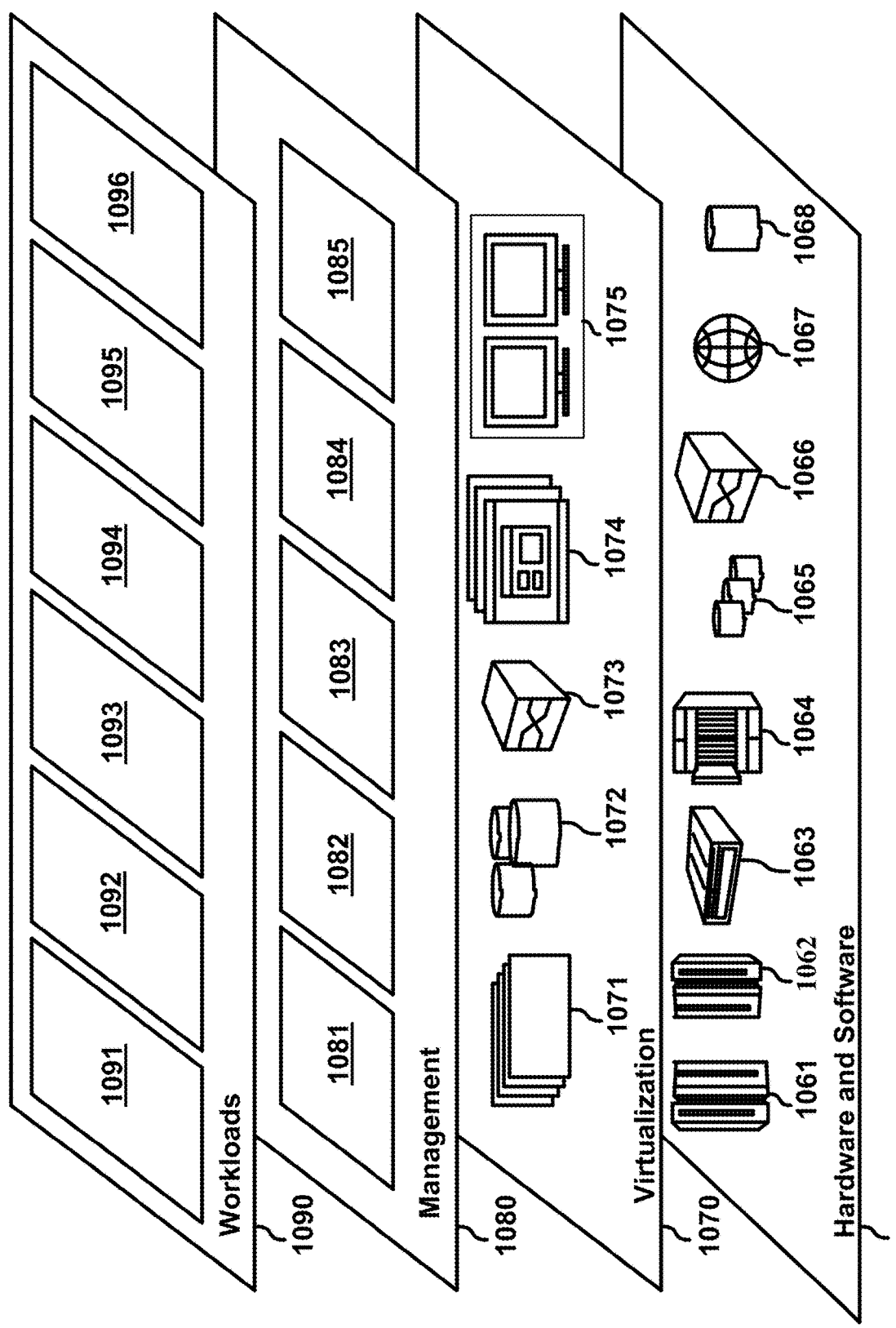
FIG. 10 illustrates a set of functional abstraction layers provided by cloud computing environment according to one illustrative embodiment.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the disclosure are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Examples of workloads and functions which may be provided from this layer include: mapping and navigation 1091; software development and lifecycle management 1092; virtual classroom education delivery 1093; data analytics processing 1094; transaction processing 1095; and database 1096.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for providing counter intuitive recommendations to a user comprising:
   determining that a trigger condition has occurred to the user;
   associating the determined trigger condition with a user profile;
   receiving a request for a recommendation;

generating a set of recommendations based on the user profile;

determining if recommendations in the set of recommendations are compatible with the trigger condition; and removing from the set of recommendation those recommendations that are determined not to be compatible with the trigger condition.

2. The method of claim 1 wherein removing filters the set of recommendations.

3. The method of claim 1 wherein the trigger condition is determined by analyzing information related to the user from data sources used to generate the user profile.

4. The method of claim 3 wherein the trigger condition is determined from a post to a social media site.

5. The method of claim 3 wherein determining the duration of the trigger condition is determined from a post to a social media site.

6. The method of claim 3 wherein determining the duration of the trigger condition is determined by analyzing electronic documents related to the trigger condition.

7. The method of claim 1 wherein associating the trigger condition with the user profile does not modify the user profile.

8. The method of claim 1 further comprising removing the association between the trigger condition and the user profile after the duration of the trigger condition has passed.

9. A computer program product embodied on one or more non-transitory computer readable storage mediums, having computer executable instructions that when executed by at least one computer having at least one processor, executes a method for providing counter intuitive recommendations to a user comprising:

determining that a trigger condition has occurred to the user;

associating the determined trigger condition with a user profile;

receiving a request for a recommendation;

generating a set of recommendations based on the user profile;

determining if recommendations in the set of recommendations are compatible with the trigger condition; and removing from the set of recommendation those recommendations that are determined not to be compatible with the trigger condition.

10. The computer program product of claim 9 wherein removing filters the set of recommendations.

11. The computer program product of claim 9 wherein the trigger condition is determined by analyzing information related to the user from data sources used to generate the user profile.

12. The computer program product of claim 11 wherein the trigger condition is determined from a post to a social media site.

13. The computer program product of claim 11 wherein determining the duration of the trigger condition is determined from a post to a social media site.

14. The computer program product of claim 11 wherein determining the duration of the trigger condition is determined by analyzing electronic documents related to the trigger condition.

15. The computer program product of claim 9 wherein associating the trigger condition with the user profile does not modify the user profile.

16. The computer program product of claim 9 further comprising removing the association between the trigger condition and the user profile after the duration of the trigger condition has passed.

17. A recommendation system configured to provide counter intuitive recommendations to at least one user comprising:

at least one processor;

at least one memory component;

a recommender engine configured to provide a recommendation to the at least one user;

the recommendation system configured to execute a method of:

determining that a trigger condition has occurred to the user;

associating the determined trigger condition with a user profile;

receiving a request for a recommendation;

generating a set of recommendations based on the user profile;

determining if recommendations in the set of recommendations are compatible with the trigger condition; and removing from the set of recommendation those recommendations that are determined not to be compatible with the trigger condition.

18. The system of claim 17 wherein removing filters the set of recommendations.

19. The system of claim 17 wherein the trigger condition is determined by analyzing information related to the user from data sources used to generate the user profile.

20. The system of claim 19 wherein the trigger condition is determined from a post to a social media site, and wherein determining the duration of the trigger condition is determined from a post to a social media site.

\* \* \* \* \*